UNITED STATES PATENT OFFICE.

W. R. WEBSTER, OF GOWANDA, NEW YORK.

IMPROVEMENT IN TANNING.

Specification forming part of Letters Patent No. 27,177, dated February 14, 1860.

*To all whom it may concern:*

Be it known that I, W. R. WEBSTER, of Gowanda, Cattaraugus county, State of New York, have invented a new and Improved Combination of Materials for Tanning Leather, a specimen of which accompanies this specification.

The nature of my invention consists in the use of a solution of chloride of lime, in which the hides are saturated after the removal of the hair by the ordinary process, and the hides pass through the bate, and afterward in combining a solution of chloride of lime with the materials used in tanning.

To prepare the hides for the action of the bark or ooze, I place them in a solution of chloride of lime containing three pounds of chloride of lime to each one hundred gallons of water.

I also make use of the following compound for tanning-liquor: To each one hundred gallons of water I add three pounds of chloride of lime, thirty pounds of gambier or catechu, six pounds of alum, and three pounds of salt, not confining myself, however, to the exact proportions as herein specified.

What I claim as my invention, and desire to secure by Letters Patent, is—

The use of chloride of lime in combination with the materials above specified, or with any materials used in the ordinary process for tanning.

W. R. WEBSTER.

Witnesses:
ED. G. FRANKS,
F. I. MURPHEY.